H. D. PEASLEE.
COMBINED CLUTCH, BRAKE, AND GEAR OPERATING LEVER FOR AUTOMOBILES.
APPLICATION FILED APR. 25, 1912.
1,274,762.
Patented Aug. 6, 1918.
6 SHEETS—SHEET 4.
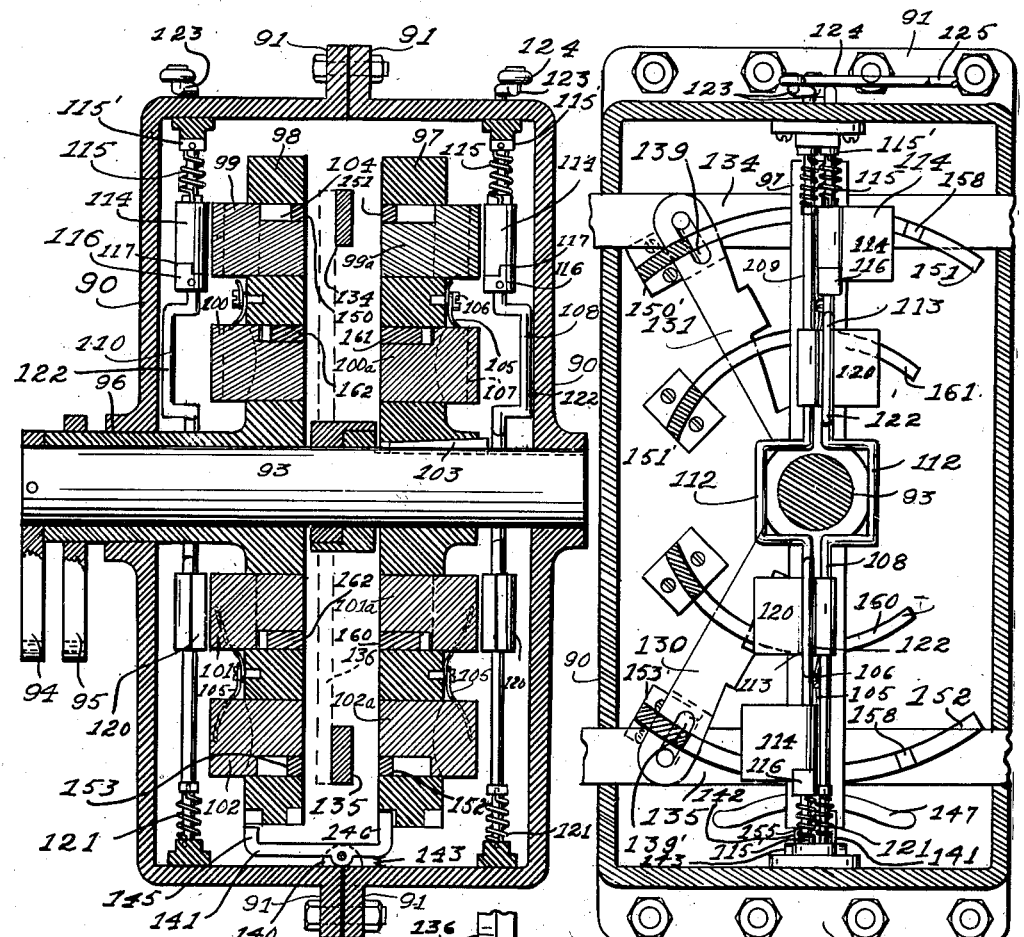
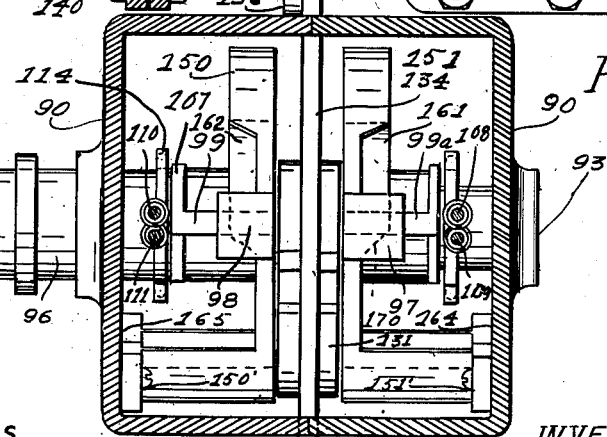
WITNESSES
Frank A. Simney
A. H. Kephart.
INVENTOR
HUGH D. PEASLEE
BY Carlos P. Griffin
HIS ATTORNEY

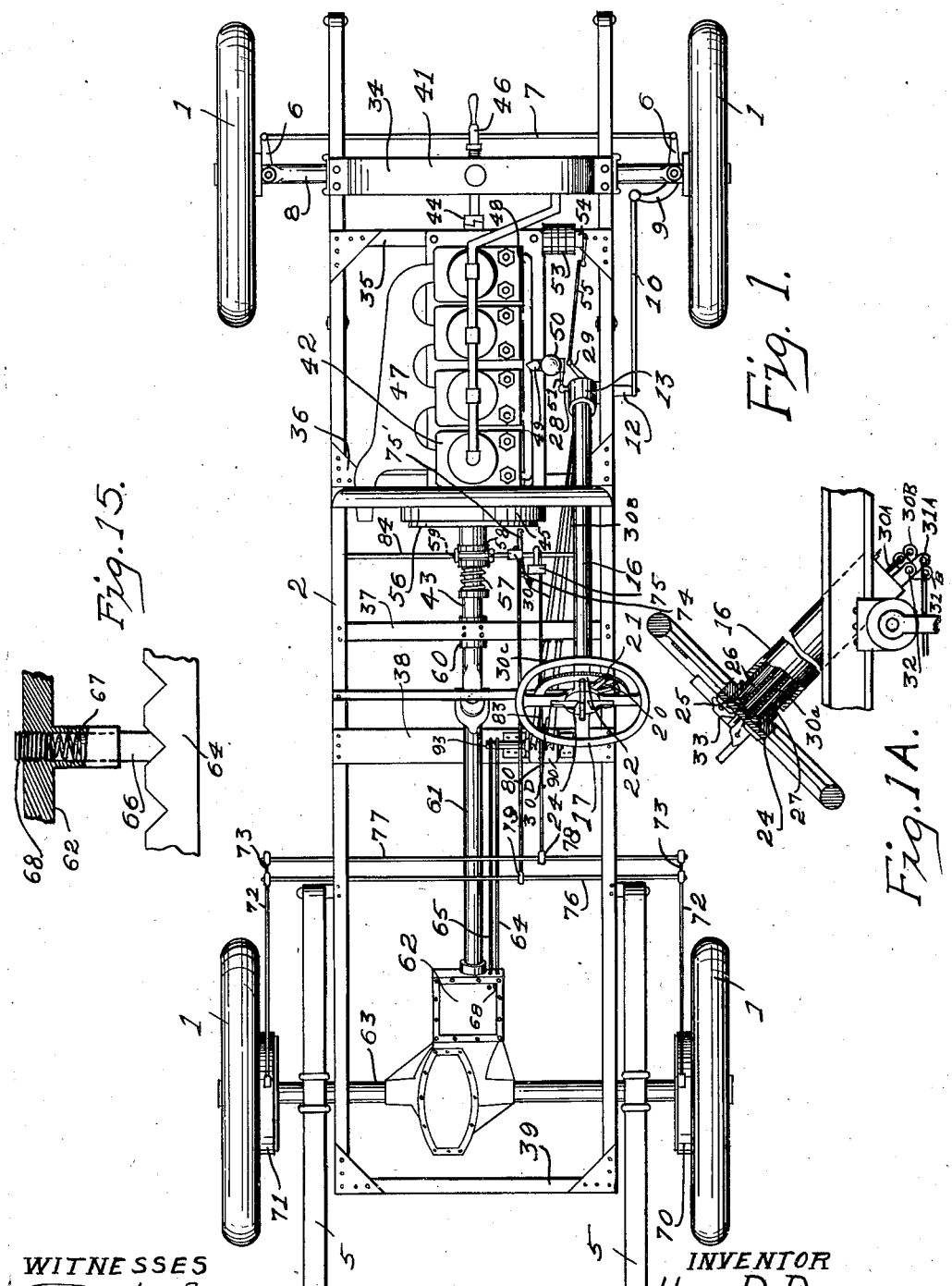

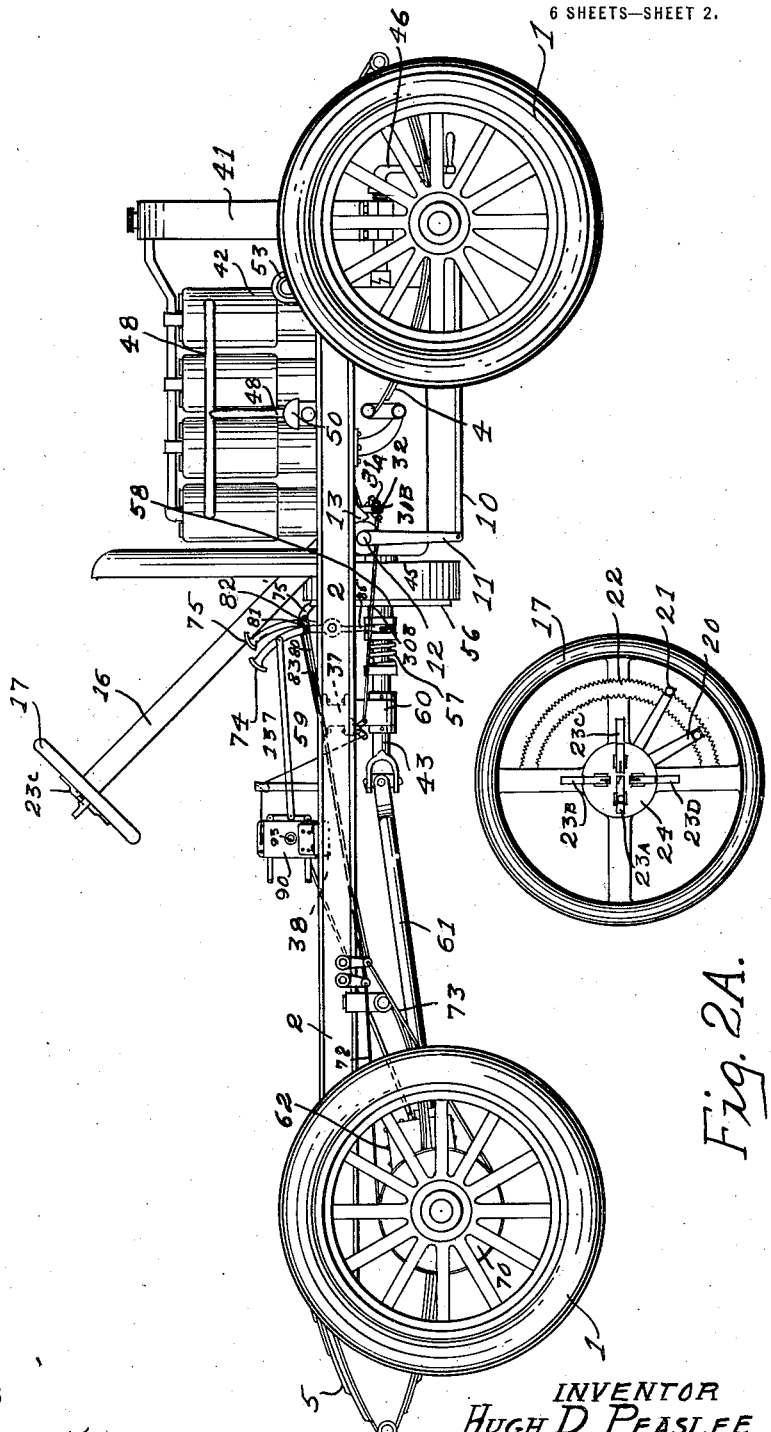

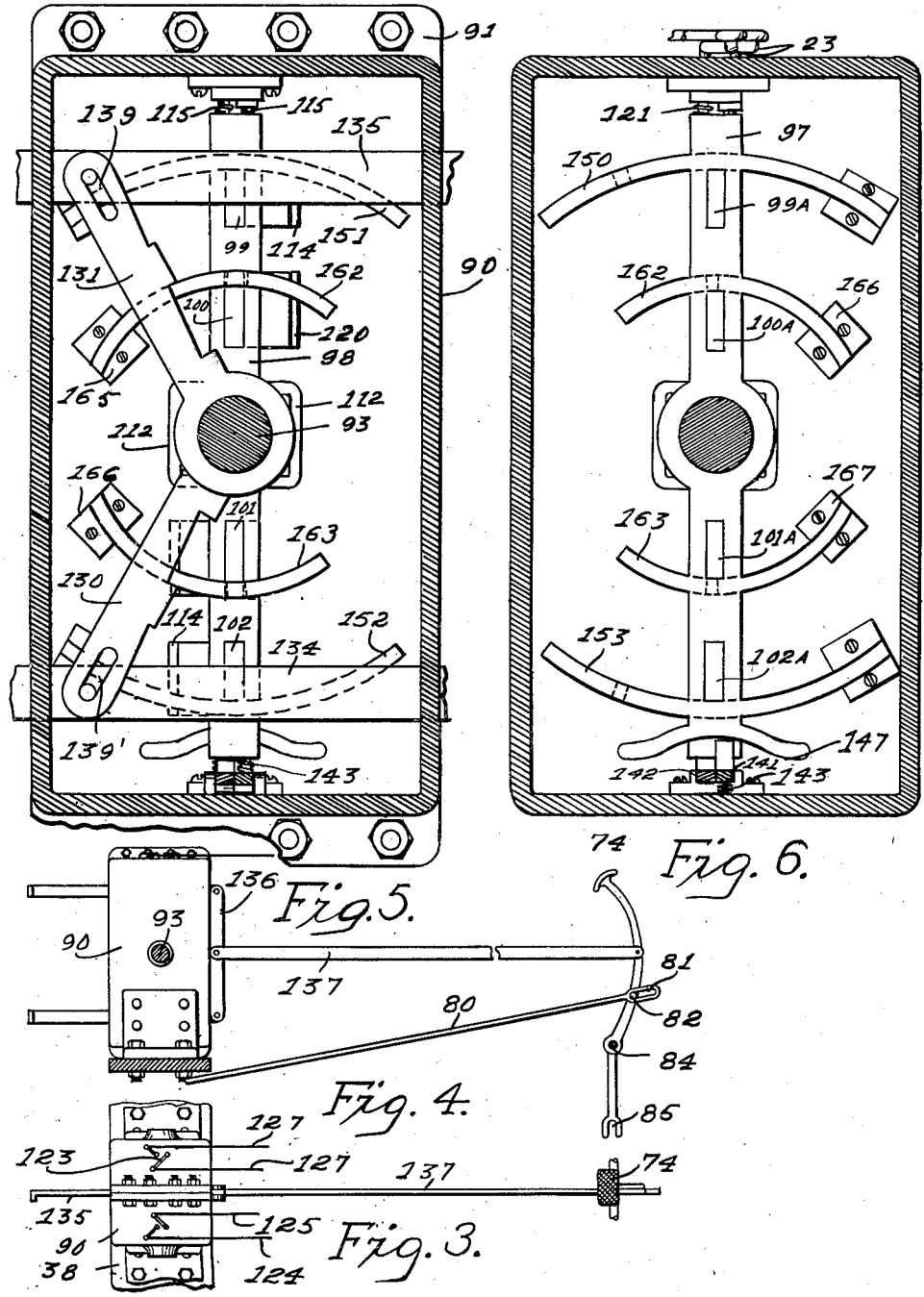
H. D. PEASLEE.
COMBINED CLUTCH, BRAKE, AND GEAR OPERATING LEVER FOR AUTOMOBILES.
APPLICATION FILED APR. 25, 1912.
1,274,762.
Patented Aug. 6, 1918.
6 SHEETS—SHEET 3.

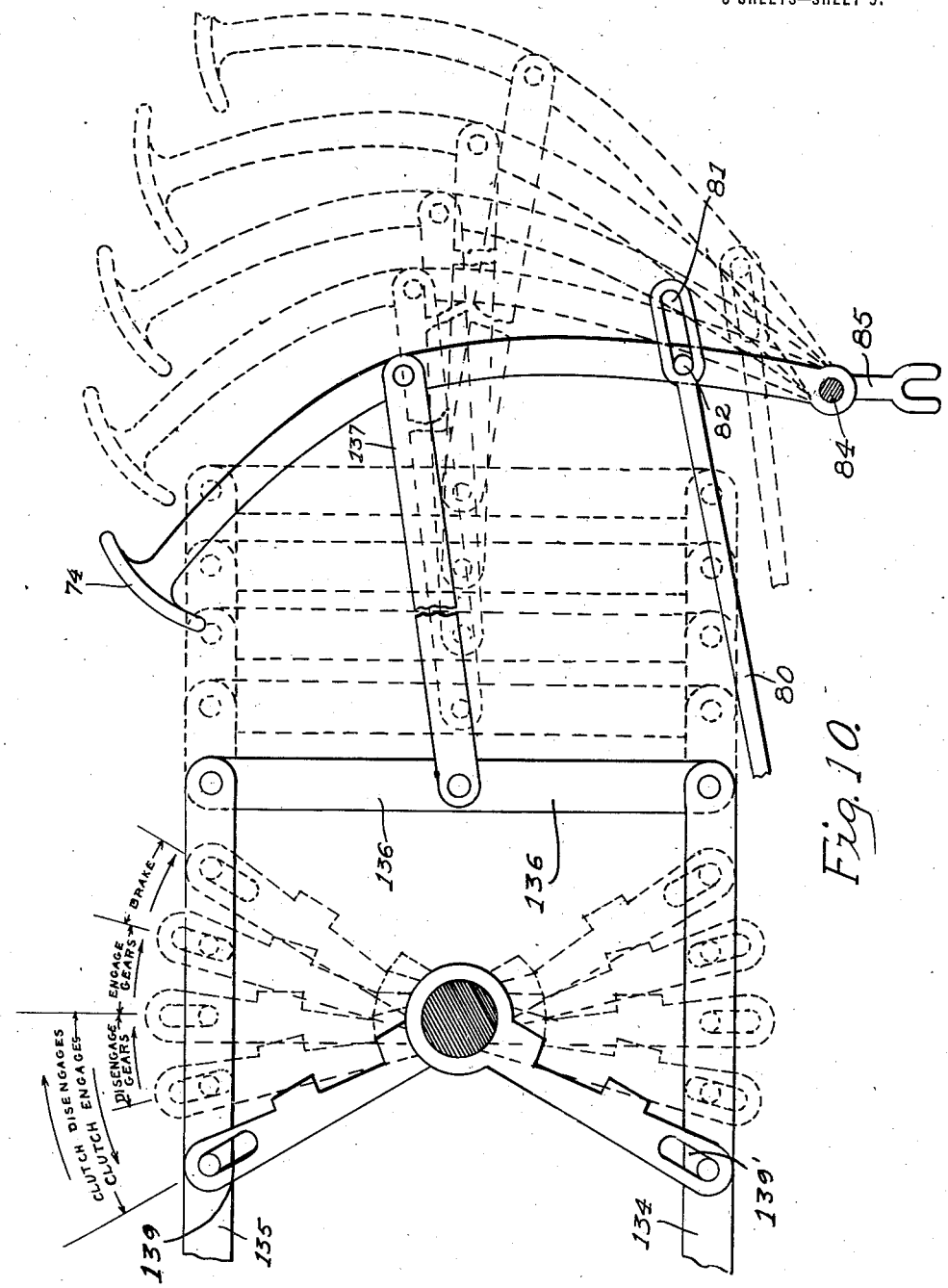

H. D. PEASLEE.
COMBINED CLUTCH, BRAKE, AND GEAR OPERATING LEVER FOR AUTOMOBILES.
APPLICATION FILED APR. 25, 1912.
1,274,762.
Patented Aug. 6, 1918.
6 SHEETS—SHEET 6.
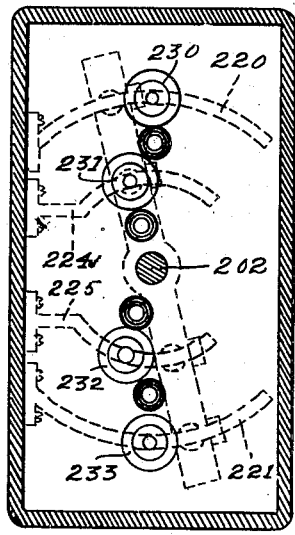
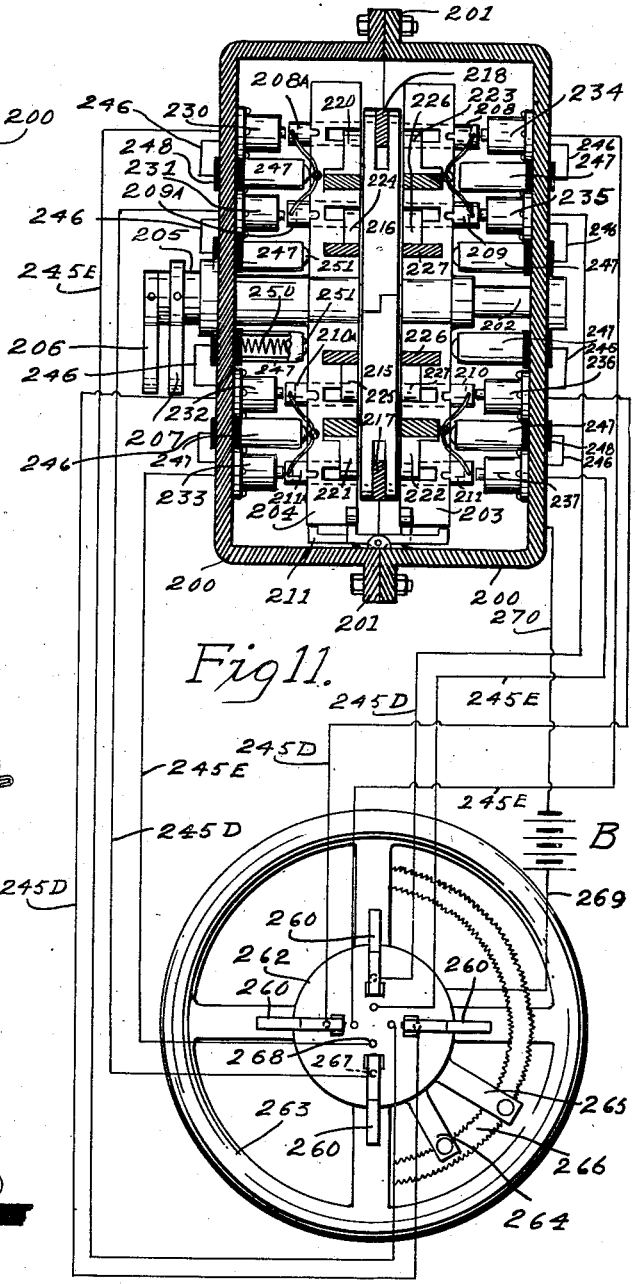
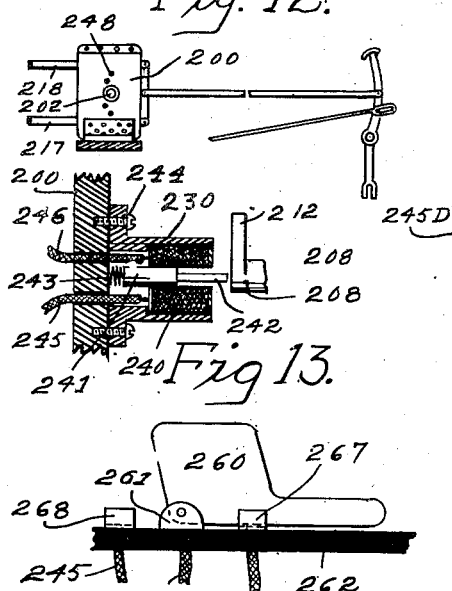
WITNESSES
Frank Simney
A.H.Kephart.
INVENTOR
HUGH D. PEASLEE
BY Carlos P. Griffin
HIS ATTORNEY

UNITED STATES PATENT OFFICE.

HUGH D. PEASLEE, OF OAKLAND, CALIFORNIA.

COMBINED CLUTCH, BRAKE, AND GEAR OPERATING LEVER FOR AUTOMOBILES.

1,274,762.     Specification of Letters Patent.     Patented Aug. 6, 1918.

Application filed April 25, 1912. Serial No. 693,125.

*To all whom it may concern:*

Be it known that I, HUGH D. PEASLEE, a citizen of the United States, residing at Oakland, in the county of Alameda and State of California, have invented a new and useful Combined Clutch, Brake, and Gear Operating Lever for Automobiles, of which the following is a specification, in such full and clear terms as will enable those skilled in the art to construct and use the same.

This invention relates to an operating lever for the brake, clutch and gear shifting devices for an automobile, and its object is to provide means whereby the clutch may be disengaged, the gears disengaged or engaged and the brake operated by means of a single foot pedal, thus dispensing with the ordinary hand levers used in connection with automobiles.

It will be understood by those skilled in the art that the ordinary gear operated automobiles have a clutch for connecting and disconnecting the engine with the change speed mechanism. Such machines have some kind of a change speed mechanism which is commonly provided with three different speeds and with means for reversing the direction of motion of the car. Also when the car is to be retarded or brought to a standstill, the brake is used for that purpose and this invention combines in a single foot pedal the means for operating all of these devices.

It will be understood by those skilled in this art that when the clutch is engaged the brake should not be applied to the car. It will also be understood that when the clutch is engaged the gears should not be disengaged, nor should the gears be engaged, since in either event injury thereto might ensue. However if the clutch is in process of being disengaged it will be clear that during a portion of this time the sliding gears may be moving toward disengagement if they are finally disengaged after the disengagement of the clutch. The engagement of the gears however, must occur after the disengagement of the clutch and when practically no torque is applied to the shaft extending from the engine to the gear box.

It will be further understood by those skilled in the art that when the gears have been engaged it must be possible to disengage the clutch and to operate the brake without interfering with the engagement of the gears, or on the other hand, if the gears are disengaged it must be possible to operate the clutch and brake without engaging the gears.

It is further to be noted that the popular clutch construction is one in which the clutch remains engaged normally, the foot pedal being used to disengage the same when pressure is applied thereto by the driver of the car.

Attention is further called to the fact that while the throw of the devices which engage and disengage the gears is comparatively small, that the movement of the foot pedal and other parts associated therewith must be considerably more in order to carry out the several operations desired to be coordinated with said foot pedal, so that means must be provided for permitting a greater movement of the foot pedal and parts connected therewith than is permitted the parts operating the gear shifting mechanism.

Another object of the invention is to provide means whereby the gear shifting devices will be locked to prevent the engagement of two different sets of gears at the same time. This locking mechanism is divided into two parts, one of which parts prevents the driver of the car from attempting to so operate two gears at the same time, while the other part positively locks the operating devices to prevent them from being operated should any part fail. Other objects of the invention will appear as the description proceeds.

In the drawings in which the same numeral of reference is applied to the same portion throughout the several views, Figure 1 is a plan view of a chassis having this appliance connected therewith, Fig. 1<sup>A</sup> is a view partly in section of the steering wheel, Fig. 2 is a side elevation of the chassis shown in Fig. 1, Fig. 2<sup>A</sup> is a plan view of the top of the steering wheel showing one of the control levers raised, Fig. 3 is a plan view on an enlarged scale of the clutch pedal showing the levers and gear shifting devices connected therewith, Fig. 4 is a side elevation of the foot pedal and parts shown in Fig. 2, Fig. 5 is a vertical sectional view of the gear shifting mechanism on the dotted line 5—5 of Fig. 3, Fig. 6 is a vertical sectional view of the gear shifting mechanism on the line 6—6 Fig. 3, Fig. 7 is a vertical sectional view of the gear shifting mechanism on the line 7—7 Fig. 3, Fig. 8 is a vertical sectional view of the gear shifting mechanism on the dotted line 8—8 Fig. 7, Fig. 9 is a sectional plan view of the gear shifting mechanism on the dotted line 9—9 Fig. 5, Fig. 10 is a side elevation of a portion of the gear shifting mechanism and foot pedal therefor indicating the position of the several parts during the several operations carried out thereby, Fig. 11 is a vertical sectional view of the gear operating mechanism taken on the line 11—11 Fig. 9 and illustrating diagrammatically the electrical control for the sliding blocks, Fig. 12 is a vertical sectional view on the line 12—12 Fig. 11 and showing in dotted lines the position of the operating arm when one of the gear sets is engaged, Fig. 13 is a vertical sectional view of one of the solenoids used for operating the slidable blocks, Fig. 14 is a view partly in section of one of the switches used on the steering posts, and Fig. 15 is a view partly in section of the lock operating mechanism of the gear shifting device.

The numeral 1 represents the ground wheels of the automobile, 2 the frame of the machine and 4 and 5 the springs supporting the frame. The front wheels of the machine are provided with the usual form of short steering knuckles 6 which are connected by means of the transverse rod 7. The front axle 8 of the machine supports the springs 4 and has the steering knuckles connected thereto in the usual manner. One of the steering knuckles has an arm 9 to which is connected the rod 10 leading from the steering gear, the rear end of said rod being pivoted to the arm 11. The arm 11 depends from a shaft 12 extending out of the steering worm box 13. This shaft operates the arm 11 in a well known manner.

The steering post 16 has a wheel 17 at the upper end thereof to operate the same, and in addition to the usual spark and throttle levers 20 and 21 operating in conjunction with the notched arc 22, the steering wheel has four levers $23^a$, $23^b$, $23^c$ and $23^d$ pivoted near the center thereof.

The levers $23^a$, $23^b$, $23^c$ and $23^d$ are pivoted on a fixed plate 24 which plate is supported by means of a tube 25 passing through the steering post, said tube being rigidly connected with the steering worm box 13. The upper end of this tube 25 has a collar thereon which prevents the tube from being displaced out of its central position within the steering post, this being necessary to prevent said tube from interfering with the proper operation of the rods 26 and 27 which are connected to the spark and throttle levers respectively. These two rods pass out of the bottom of the steering worm box and have arms 28 and 29 secured thereto for the operation of the spark advance and throttle as will be later explained.

Connected with the levers $23^a$, $23^b$, $23^c$ and $23^d$ are four cables $30^a$, $30^b$, $30^c$ and $30^d$ which extend down through the central tube 25 and are connected at their lower ends to four bell crank levers $31^a$, $31^b$, $31^c$ and $31^d$, said levers being pivoted on a shaft 32 suitably supported from the frame of the machine below the worm box. The levers $23^a$, $23^b$, $23^c$ and $23^d$ are held in the position indicated in Fig. 11 by means of the cables to which they are secured, a spring pulling on said cables and permitting said levers to be raised to raise said cables a like amount. These levers are so close to each other on the plate against which they are secured that when one of them has been raised it is not possible to raise any of the others, and when any one of them is raised it will remain in that position since the levers each have a flat surface as indicated at 33.

The frame of the machine has suitable transverse braces 34 to 39 inclusive, the brace 34 supporting the radiator 41, the two braces 35 and 36 supporting the engine 42, the brace 37 having a bearing for the shaft 43, the brace 38 supporting this gear shifting mechanism, while the remaining brace 39 simply holds the sides of the frame together.

The engine 42 has the usual shaft 44 projecting therefrom and carrying the fly-wheel 45, a crank 46 being used to start the engine in the usual manner. The engine shown is of the ordinary explosive type having its exhaust manifold shown at 47 and the inlet manifold shown at 48, the latter having a pipe 49 connected with the carbureter 50. This carbureter has an arm 51 which opens and closes the throttle valve when the rod 52 connected thereto is moved. The rod 52 is connected to the arm 28 thus enabling the throttle to be opened and closed from the seat of the driver as usual.

The magneto is shown at 53 and the spark advancing box at 54, a rod 55 connecting said box with the arm 29 so that the spark may be advanced as usual from the steering post. Within the fly-wheel is a cone clutch 56 which is pushed forward into engagement therewith by means of a suitable spring 57, a ring 58 having projecting lugs 59 being used to pull the clutch out of engagement with the fly-wheel and thus enabling the engine to be disconnected from the transmission mechanism.

The shaft 43 is supported in a bearing 60 below the cross brace 37. The usual shaft 61 is connected with the shaft 43 and case 62 within which the transmission mechanism is assembled. In the drawing the transmission mechanism is shown mounted adjacent the rear axle 63, but it will be understood from what is to follow herein that the position of the transmission mechanism has nothing to do with this invention.

The transmission mechanism may be of any well known type, as for example, that type in which one speed is produced by the forward movement of a rod 64 and another speed by a backward movement thereof, the reverse and another speed being attained by forward and rearward movements of a rod 65.

These two rods each have three notches therein within the case for the transmission mechanism. These three notches are for the purpose of releasably locking the rods 64 and 65 in the neutral position and in their forward and rearward positions this locking being accomplished by means of latches 66, one for each rod 64 and 65, which latches are held in engagement with said rods by means of a spring 67, a screw threaded plug 68 holding the spring in contact with the latches and the latter in contact with their respective rods.

The rear wheels are each provided with brake drums 70 and 71, which brake drums have two sets of brakes, one set operated by the rods 72 and another set operated by the rods 73. The precise construction of these brakes at the drums is immaterial to the invention herein more than that one set of brakes is operated by the foot-pedal 74 while the other set of brakes is operated by the foot pedal 75.

The brake rods 72 at each side of the machine are connected to the lever arms on a shaft 76, while the brake rods 73 at each side of the machine are connected to the lever arms on a shaft 77. Each of these shafts is provided with a lever arm as indicated at 78 and 79, the arm 78 having a rod 80 connected thereto, which rod is slotted as indicated at 81 and connected with the foot lever 74 by means of a pin 82.

The arm 79 is connected with the foot pedal 75 by means of a rod 83 and this brake is used for emergency purposes. Mounted at the rear of the fly-wheel is a shaft 84 which shaft is suitably braced to withstand the necessary thrusts put upon it in using the two foot levers. This shaft is rigidly connected with the lower end of the lever 74 and it has depending therefrom two open slotted levers 85, the lower ends of which levers pass over the lugs of the collar 58. The foot pedal 75 is provided with a rack 75' to hold the brake operated thereby in a fixed position, when the car is stopped.

It will therefore be seen that any forward movement of the foot lever will slide the clutch 56 away from the fly-wheel, and with this invention it is contemplated that the clutch shall be completely disengaged from the fly-wheel with about one-half the throw of the lever 74. (Note Fig. 10). It will also be noted from this figure that the brake operated by the rod 80 will be operated only during the last part of the throw of the foot lever, this being necessary in order not to interfere with the operations to be carried out by said lever.

The gear shifting mechanism is inclosed within a divided case 90, said case having flanges 91 to secure the two parts thereof together. This case is mounted on the transverse brace 38 and it has a brace 92 connecting it with the transverse brace 37. The case 90 has a suitable shaft 93 extending therethrough, said shaft being capable of being rotated as will be explained.

The shaft 93 extends through the casing 90 and has an arm 94 rigidly connected therewith, which arm is connected to the rod 65. The rod 64 is connected to a similar arm 95 rigidly secured on a sleeve 96 surrounding the shaft 93. The shaft 93 and sleeve 96 are each rotated in one direction or the other a small amount by means of the operating levers 97 and 98 respectively.

These operating levers each extend on both sides of the shaft 93 and each lever is provided with four blocks 99 to 102 and 99$^a$ to 102$^a$. The blocks 99$^a$ to 102$^a$ with the operating lever 97 are secured to the shaft 93 by means of the key 103.

Each block is notched as indicated at 104 for the purpose of providing means to move the blocks laterally at the proper times, as will be later explained. Each block is lightly held in the position indicated in Fig. 8 by means of a small spring 105, which spring is secured to the arm 97 or 98 by means of a screw 106. There are four of these springs and each spring serves to hold two of the blocks in the position indicated in said figure.

Each block has a heel portion 107 which heel portions stand in different directions as shown in Fig. 9. Within the case 90 and at the side of the levers 97 and 98 there are four shafts 108, 109, 110 and 111.

These shafts are closely adjacent each other and each of them is provided with a crank portion 112 to enable said shaft to pass around the shaft 93 and around the sleeve 96. In addition to the foregoing crank, each shaft also has a crank portion 122 to permit the movement of the arms carried by the adjacent shaft without interference therewith by said shaft.

Each shaft is provided with an arm 114 which arm is loosely mounted on the shaft and permitted to move in one direction against the resistance of a spring 115, which spring is connected to said arm and to a fixed collar 115' on the shafts 108, 109, 110 and 111, as may be.

The collar 116 has a projecting lug 117 on its upper edge which lug engages the lower edge of the boss of the arm 114. This construction makes it possible for the shaft 110 to forcibly move the arm 114 away from the block, but when rotated in the other direction the spring 115 is the only means for causing the arm to press against the block 99. Below the shaft 93 the shaft 110 has an arm 120 rigidly connected thereto, said arm extending from said shaft in the opposite direction from the arm 114. This arm is held against the block 101 adjacent it by means of the spring 121 at the bottom of the shaft, said spring having one end connected to the casing and the other end connected to the shaft 110. It will be noted that each of the shafts 108, 109, 110 and 111 has an arm which extends across the axis of the adjacent shaft, note Fig. 7, and it therefore becomes necessary to provide each of these shafts with a cranked portion 122 to permit the necessary movement of the several shafts and arms connected thereto. It will also be noted that each of these shafts is substantially the same as the other one, except that they operate right and left handedly. Each shaft 108 to 111 inclusive has a short crank arm 123 at the top thereof, and cables 124, 125, 126 and 127 connect said arms with the bell cranks at the foot of the steering post. It will therefore be seen that the springs 121 on the shafts 108 to 111 inclusive each tend to keep the arms rigid therewith in contact with the slidable blocks in the operating levers 97 and 98, but when the levers at the top of the steering post are raised said shafts may be rotated a small amount to cause the arms 114 to contact with the blocks adjacent them, thereby advancing said blocks into the plane of movement of the levers 130 and 131. These levers are pivoted on the shaft 93 and are connected at their ends to slidable bars 134 and 135 respectively, said bars extending through the casing and being rigidly connected at their front ends to a bar 136. The bar 136 is connected pivotally to a link 137 extending to the foot lever 74. In order to permit the necessary relative movement of the levers 130 and 131 and the bars 134 and 135 which operate them, slots 139 and 139' are cut in said levers.

In order to insure against the operation of two different gear sets at the same time, the bottom of the case through which the shaft 93 extends has two lugs 140 thereon, and locking bars 141 and 142 are pivoted between said bars, springs 143 and 144 holding said locks in the position shown in Fig. 8. These locking bars have their ends turned up as shown at 145 and 146 and the ends 146 contact with the curved surfaces 147 on the bottom of the levers 97 and 98, said curved surfaces causing said bars to lock the lever not moved when the adjacent lever is moved, the ends 145 of said bars taking in notches 148 in the bottoms of said levers 97 and 98. It will be understood that only one of the bars 141 and 142 is operated at a time, the one operated locking the opposite lever.

In operation one of the levers at the top of the steering post is raised, whereupon one of the shafts 108, 109, 110 and 111 will be turned so that one of the arms 114 will push one of the blocks 99, etc., out. When this takes place the foot lever 74 may be operated and on a sufficient forward motion of said lever, one of the levers 97 or 98 will be pulled either forward or back at the top, as the case may be. However, if the clutch is to be operated in the usual manner it is necessary to provide means whereby the blocks which move the arms 97 and 98 when contacted with by the levers 130 or 131 above or below the shaft 93, will be withdrawn from contact with said levers 130 or 131 at the end of the throw of said arms 97 and 98, thus permitting the levers 130 or 131 to pass freely by them. This means is a set of four circular cams 150, 151, 152 and 153 which are secured to the casing 90 at their ends, as shown at 154 to 157 respectively, each of said cams passing through a slot in the arms 97 or 98.

Each of these cams has a beveled portion 158 in front of the shaft 93, said beveled portion of said cams contacting with the shoulders of the blocks 99, 99ª, 102 and 102ª respectively when one of the rods 64 or 65 has been moved into the engaged position, whether to the front or to the rear of the neutral position. Therefore, as soon as the gears have been engaged the levers 130 and 131 are free to move back and forth without being interfered with by the blocks in the levers 97 and 98, and having been engaged the gears would remain in that position since the lock at the bottom of the case 90 would be set to prevent the operation of the other set of gears, and the latch in the gear case would hold the engaged set of gears in that position. These cams are secured to the side of the case at 150', 151', 152' and 153'.

The next step will be the disengagement of the gears. This is accomplished by letting the lever on the top of the steering post which is up, fall down, the spring 121 on the shaft 108 for example, causing the arm rigid with said shaft to move into contact with the adjacent slidable block in the arm 97, thus leaving said block in a position to be engaged with the lever 130 on its next forward movement. Having thus placed one of the arms 120 against the adjoining slidable block the next forward movement of the foot pedal will return the lever arms 97 or 98 to the normal position, and to prevent said arms from being turned into such a position as to engage the other gear set with which their operating rods 64 and 65 are connected, four circular cams 160, 161, 162 and 163 are used. The four cams 160, etc., are secured to the side of the case 90 at 164, 165, 166 and 167 respectively. Each of the cams passes through slots in the lever arms 97 and 98, one cam above and one cam below the shaft 93 for each arm. Since these cams are for the purpose of stopping the arms at the neutral position, they each have an inclined face 170 at such a place as will remove the blocks, adjacent them from the path of the levers 130 or 131, as the case may be, when the arms 97 or 98 are exactly in the mid-position. When said blocks have been so removed the levers 130 and 131 are free to move back and forth at the will of the operator without being in any way interfered with by the gear shifting levers.

Since the cables from the bell crank levers at the foot of the steering post which connect with the small cranks at the top of the case must pass thereto low enough to be out of the way of the floor of the machine, small pulleys 172 and 173 are used to direct said cables in the proper path.

From the above description it will be clear that the engine may be started in the usual manner, assuming the gears to have been disengaged when the car was last used, and may then have the gears of any set engaged by lifting one of the levers at the top of the steering post, and then pushing forward the clutch pedal. This movement will release the clutch and after said release will engage the given gear set, and provided it is not desired to start the car at once the pedal may be pushed still farther and engage the brake to hold the car at a standstill. When it is desired to start, the clutch is slowly engaged in the usual manner, the lever on the steering post remaining up until it is necessary to change gears, whereupon it is lowered, and if another gear set is to be used that lever for operating that gear set is raised. This may all take place before the originally used gear set has been changed and before the clutch has been disengaged, whereupon the foot pedal may be pushed forward and it will on a part of its stroke disengage one set of gears and on being pushed still farther forward it will engage the set of gears it is desired to change to.

If it is desired to use a gear set having more than four changes all that is necessary is to couple another device of the character of that in the case 90 on, in the rear thereof so that the bars 134 and 135 are continually working four levers back and forward instead of only two.

It will also be clear that it is possible to provide an electrical control for the devices which set the slidable blocks in the paths of the levers 134 and 135, and such a control is shown in Figs. 11 to 14.

With the electrically controlled gear shifting mechanism a split casing 200 is used, said casing having flanges 201 to secure the two parts thereof together. This casing has a shaft 202 extending therethrough, substantially the same as the shaft 93 used in the other form of the invention. This shaft has an arm 203 secured thereto, and pivoted thereon is an arm 204 which has a tube 205 around the shaft 202 and extending out of the casing 200, substantially the same as in the previous form of the invention.

The shaft 202 has an arm 206 rigidly connected therewith while the sleeve 205 has an arm 207 rigidly connected therewith. The arms 203 and 204 carry eight slotted slidable blocks 208, 209, 210, 211, 208$^a$, 209$^a$, 210$^a$ and 211$^a$, and each of these blocks is provided with an extended head 212. These blocks or plugs are each held in the position indicated in Fig. 11 by means of four springs 213, screws 214 holding said springs in their respective places.

Between the two arms 203 and 204, two levers 215 and 216 are pivoted on the shaft 202. These two levers are pivoted in precisely the same manner as the levers 130 and 131 in the other form of the invention, bars 217 and 218 being used in this case for the operation thereof. Circular cams 220, 221, 222 and 223, substantially the same as the cams used in the other form of the invention, are used to disengage the arms 203 and 204 from the levers 215 and 216 upon the engagement of the desired gear set. Circular cams 224, 225, 226 and 227 also the same as used in the previous form of the invention are used to disengage the arms 203 and 204 from the levers 215 and 216 upon the return thereof to the mid-position.

The slidable blocks are operated by means of eight solenoids 230, 231, 232, 233, 234, 235, 236 and 237. Each of these solenoids is constructed as shown in Fig. 13, and they are provided with a series of windings 240 near the outer end thereof and with a magnetic plunger 241, which plunger has a non-magnetic rod 242 connected therewith. The plunger is held in the position indicated in Fig. 13 by means of a light spring 243. The case within which the solenoid is placed is secured to the side of the case 200 by means of suitable screws 244.

Electric wires 245 and a wire 246 extend into and connect with the solenoid windings. Each of the solenoids above mentioned is connected precisely the same as the solenoid shown in Fig. 13. Immediately adjacent each solenoid is a tube 247, there being eight of said tubes and each tube is insulated by means of a fiber plug 248, which secures it to the casing 200.

Each of these tubes has a light spring 250 therein which holds the ball 251 lightly in contact with the adjacent arm 203 or 204 as the case may be. There are four duplicate electric circuits which are operated by means of the switch 260 pivoted on ears 261 secured to the insulated plate 262 at the top of the steering wheel 263, said steering wheel also having the usual spark and throttle advancing levers 264 and 265; said levers 264 and 265 operate in conjunction with the notched arc 266.

The switch lever 260 may contact either with the terminal 267 or 268 at will, but when it is raised to contact with the terminal 268, none of the other switches 260, of which there are four, can be raised to contact with the other terminal 268. A source of electric current is indicated at B and one wire 269 extends to and connects with each of the levers 260 between the terminals 267 and 268. A wire 270 extends from the other terminal of the battery to the case 200 and is there grounded.

As above stated, each solenoid is provided with a wire 245 and with a wire 246. The wires 246 all lead to and connect with the tubes 247 while the wires 245 all lead to the insulated plate 262. It will be observed that the plungers of the solenoids 230, 233, 234 and 237 are used for the purpose of advancing the adjacent slidable blocks when it is desired to engage a given gear set. Therefore, the wires 245 leading from these solenoids connect with the terminal 268 so that when it is desired to energize one of the solenoids to engage a given gear set, it is necessary to raise one of the levers 260 until it contacts with the points 268 and it will then interfere with the raising of any of the other switch levers.

It will similarly be observed that when it is desired to disengage a given gear set and to return the levers 203 and 204 to their central position that one of the solenoids 231, 232, 235 or 236 must be energized, and it will be seen that the wires 246 extending from said solenoids connect with the adjacent tube 250, while the wires 245 extending from the other terminal of said solenoid is connected with the contact 267. These two sets of wires are designated respectively by 245ᴱ and 245ᴰ.

The position of the tubes 250 is such that when one of the arms 203 or 204, note Fig. 12, has been moved to an engaged position the ball in said tube will contact with said arm and will permit the solenoid 231 to be energized if one of the levers 260 is turned down into the position indicated in Fig. 14. This will move the adjacent slidable block outwardly into the path of the lever 216 and upon its next forward movement it will disengage the gear set and return the lever, say for example 204, to its normal position, and as soon as it reaches the normal position the contact with the disengaging solenoid circuit is broken.

When in the normal position, that is, when either of the arms 203 or 204 are straight up and down, it will be possible to energize one of the solenoids 230, 233, 234 or 237 since the balls in the upper and lower tubes 247 then may contact with said lever arms. The desired solenoid may then be energized and will move the adjacent slidable block into the path of the levers 215 or 216, as the case may be, whereupon said gear set will be engaged upon the next forward movement of said levers and as soon as the gear set has been engaged the proper circular cams 220, 221, 223 or 222 will move the slidable block out of the path of the levers 215 and 216, as the case may be, and said arm will move out of contact with the ball in the tube 250 and thus break the circuit used to energize the solenoid adjacent the slidable block it is desired to move.

The locking devices at the bottom of the arms 203 and 204 are precisely the same as that shown in the other form of the invention and even though other circuits may be closed in addition to the one it is desired to operate, it will be impossible to engage more than one gear set at a time.

Having thus described my invention what I claim as new and desire to secure by Letters Patent of the United States, is as follows:

1. In a control system for automobiles, a running gear, a motor, a change gear mechanism connected with the motor and running gear, a brake, a clutch for connecting and disconnecting the motor and change gear mechanism, a single operating lever limited to movement in a single plane for the clutch, brake and change gear mechanism, and means whereby the clutch is disconnected by said lever before any other operations are effected, as described.

2. In a control system for automobiles, a running gear, a motor, a change gear mechanism connected with the running gear and motor, a brake, a clutch for connecting the motor and change gear mechanism, a single lever limited to movement in a single plane for operating the clutch, change gear mechanism and brake, means to select any one of the gear changes desired, and means whereby the clutch is disconnected by said lever before any other operations are effected, as described.

3. In an automobile control, the combination of a running gear, a motor, a change gear mechanism connected with the running gear and motor, a clutch for connecting and disconnecting the motor and change gear mechanism, a brake, means to select any one of the gear changes desired, a single lever for operating the clutch, change gear mechanism and brake, and means for automatically disengaging said lever from the gear shifted whereby the braking, clutching and declutching operations may be effected without disturbing the change gear mechanism, substantially as described.

4. In an automobile control, the combination of a running gear, a motor, a change gear mechanism, a clutch to disengage the motor from the running gear and brake, a single lever to operate the clutch, brake and change gear mechanism, means to connect said lever with the change gear mechanism whereby the gear changes may be effected, means to engage the change gear mechanism with said lever to effect the disengagement of said gears, and means to shift said engaging mechanism to enable the lever to be moved at will without changing the position of said gears whether engaged or disengaged, as described.

5. In an automobile control, the combination of a running gear, a motor and change gear mechanism, a clutch to disengage the motor from the change gear mechanism, a brake, a single lever to operate the clutch, change gear and brake mechanism, and a series of levers, one for each gear change to set the mechanism for the desired gear engagement, as described.

6. In a control system for automobiles, a running gear, a motor, a change gear mechanism connected with the motor and the running gear, a clutch, a brake, means to select any one of the gear changes desired, a single lever limited to movement in a single plane for effecting said gear changes and for operating the clutch and brake, and means for automatically disengaging said lever from the change gear mechanism after the given gear engages, as described.

7. In a control system for automobiles, a running gear, a motor, a change gear mechanism connected with the motor and the running gear, means to select a desired gear engagement, means to engage the selected gears and to disengage any gears already engaged, a clutch for disconnecting the motor from the gearing, and a single lever limited to movement in a single plane for operating the clutch and for engaging and disengaging the desired set of gears, as described.

8. In a control system for automobiles, a running gear, a motor, a change gear mechanism connected with the motor and running gear, means to set the apparatus for a given gear disengagement, and to select a desired gear engagement at the same time, a clutch to disengage the motor from the gearing, a single operating lever, and means whereby in a single movement of said lever said clutch and gear set may be disengaged followed by the engagement of the desired gear set, as described.

9. In a control system for automobiles, a running gear, a motor, a change gear mechanism, a clutch for connecting the motor and gearing, means to set the apparatus for a given gear disengagement, and therefor at the same time, to select a given gear engagement, a brake, a single operating lever, and means whereby the given gear set and the clutch will be disengaged in a single movement of said lever followed by the engagement of the desired gear set and the application of the brake thereafter, as described.

10. In a control system for automobiles, a running gear, a motor, a change gear mechanism, a clutch for connecting the motor and gearing, a brake, means for selecting a given gear engagement, a single operating lever for the clutch, the change gear mechanism and the brake, and means whereby the given gear set will be engaged by said lever after the disengagement of the clutch, as described.

11. In a control system for automobiles, a running gear, a motor, a change gear mechanism connected with the motor and gearing, a clutch for disconnecting the motor from the running gear, a brake, means to select a given gear engagement, a single operating lever for the clutch, gear change mechanism and brake, means whereby the clutch will be disengaged by said lever prior to the engagement of the desired gear set, and means whereby the brake may be applied after said gear engagement, as described.

12. In a control system for automobiles, a running gear, a motor, a change gear mechanism, a clutch for connecting the motor and gearing, a single lever for operating the clutch and change gear mechanism, means whereby said lever may disengage a set of gears on one portion of its forward stroke, means whereby said lever may engage another set of gears on a further forward stroke after the other set of gears has been disengaged.

13. In a control system for automobiles, a running gear, a motor, a change gear mechanism connected with the motor and running gear, a clutch for disconnecting the motor from the gearing, a brake, a single lever for operating the clutch, the change gear mechanism and brake, means whereby a gear set is moved toward disengagement during the period of release of the clutch, and means to engage another gear set after the disengagement of the clutch and the previously used gear set, as described.

14. In a control system for automobiles, a running gear, a motor, a change gear mechanism connected with the motor and running gear, a clutch for disconnecting the motor from the gearing, a brake, a single lever for operating the clutch, the change gear mechanism and the brake, means whereby a gear set in engagement will be moved toward disengagement during the period in which the clutch is being disengaged and will be completely disengaged at the time the clutch is disengaged, means to engage another set of gears after the disengagement of the previous set of gears, and means whereby the brake will be applied by said lever after the engagement of a gear set, as described.

15. In a control system for automobiles, a running gear, a motor, a gear case, a change gear mechanism therein connecting the motor and running gear, a clutch for disconnecting the motor from the gearing, a brake, a single lever for the operation of the clutch, change gear mechanism and brake, a series of levers for the setting of the apparatus for given gear changes said levers having means to prevent the operation of one of the set at a time when it is improper to operate that one.

16. In a control system for automobiles, a running gear, a motor, a gear case, a change gear mechanism therein connecting the motor and running gear, a clutch for disconnecting the motor and gearing, a brake, a foot lever for the operation of the change gear mechanism, the clutch and brake and a series of levers above the steering wheel for setting the apparatus for given gear changes.

17. In a control system for automobiles, a running gear, a motor, a gear case, a change gear mechanism therein connecting the motor and running gear, a clutch for disconnecting the motor from the running gear, a brake, a lever for the operation of the change gear mechanism, clutch and brake, means whereby any gears engaged may be disengaged after the release of the clutch, means whereby another set of gears may be engaged upon a further movement of the clutch operating lever, and means whereby the clutch operating lever may be thereafter operated to engage and disengage the clutch without disturbing the relative position of the gears.

18. In a control system for automobiles, a running gear, a motor, a gear case, a change gear mechanism connected with the running gear and motor, a clutch for disconnecting the motor from the gearing, a pair of rods extending out of the change gear mechanism case for effecting the gear changes, a pair of operating arms connected with said rods, means to lock one of said arms when the other arm is moved, and a single lever for effecting the movement of both of said arms and the operation of the clutch, as described.

19. In a control system for automobiles, a running gear, a motor, a gear case, a change gear mechanism connected with the motor and the running gear, a pair of rods extending out of the change gear case for effecting the gear changes, a pair of pivoted arms, a connection between each of the arms and each of the rods, means to lock one of the arms when the other is moved, a single lever for the operation of the clutch and said arms, and means whereby either of said arms may be connected with said lever to effect the desired gear changes, as described.

20. In a control system for automobiles, a running gear, a motor, a gear case, a change gear mechanism connected with the motor and running gear, a clutch for disconnecting the motor and gearing, a pair of rods extending out of the change gear mechanism case for effecting the gear changes, a foot lever for operating the clutch, a pair of levers connected with the rods extending to the gear case, slidable blocks carried by said levers, secondary levers connected with the foot lever, and means to push said slidable blocks into the path of the secondary levers for the engagement and disengagement of the several gear sets, as described.

21. In a control system for automobiles, a running gear, a motor, a change gear mechanism connecting the motor and running gear, a brake, a single lever for the operation of the change gear mechanism and the brake, and electrical means whereby any desired gear change may be selected for operation by said lever, as described.

22. In a control system for automobiles, a running gear, a motor, a change gear mechanism connecting the motor and running gear, a clutch for disconnecting the motor from the gearing, a single lever for the operation of the clutch and the change gear mechanism, and electrical means for the selection of the desired gear change to be made by said lever, as described.

23. In a control system for automobiles, a running gear, a motor, a change gear mechanism connecting the motor and the running gear, a clutch for disconnecting the motor from the gearing, a brake, a single lever for the operation of the change gear mechanism, the clutch and the brake, and electrical means whereby the desired gear change may be selected for the operation by said lever, as described.

24. In a control system for automobiles, a running gear, a motor, a change gear mechanism connecting the motor and the running gear, a clutch for disconnecting the motor from the running gear, a brake, a single lever for effecting the gear changes, the operation of the clutch and the operation of the brake, and electrical means for the selection of any given gear engagement or disengagement, as described.

25. In a control system for automobiles, a running gear, a motor, a change gear mechanism connecting the motor and the running gear, electrical means to select a given gear engagement, electrical means to disengage the set of gears so engaged, a clutch for disconnecting the motor from the gearing, and a single lever for the operation of the clutch and for effecting the desired gear change when the given selection has been made, as described.

26. In a control system for automobiles, a running gear, a motor, a change gear mechanism connecting the motor and the running gear, a clutch for disconnecting the motor from the gearing, electrical means to set the apparatus for a given gear disengagement, and to select a given gear engagement at the same time, and a single operating lever for the clutch and for effecting the selected gear change, as described.

27. In a control system for automobiles, a running gear, a motor, a change gear mechanism connecting the motor and running gear, a clutch for disconnecting the motor from the gearing, a brake, electrical means for selecting a given gear disengagement, electrical means for selecting a given gear engagement at the same time, and a single lever for operating the clutch and brake and for effecting the selected gear changes, as described.

28. In a control system for automobiles, a running gear, a motor, a gear case, a change gear mechanism therein for connecting the motor and running gear, a clutch for disconnecting the motor from the gearing, a brake, electrical means for selecting a given gear change, a foot lever to effect the gear change so selected, and also having means to operate the clutch and brake.

29. In a control system for automobiles, a running gear, a motor, a gear case, a change gear mechanism connecting the motor and the running gear, a clutch for disconnecting the motor from the gearing, a brake, electrical means for setting the apparatus for a given gear disengagement, electrical means to select a given gear engagement at the same time, a single lever for the operation of the clutch, brake and gear change mechanism, said lever effecting the release of the clutch, the disengagement of a set of gears and the engagement of another set of gears and the application of the brake in the order named in a single forward movement.

30. In a control system for automobiles, a running gear, a motor, a gear case, a change gear mechanism for connecting the running gear and motor, a clutch for disconnecting the motor from the gearing, a pair of rods extending out of the change gear mechanism case, a foot lever for the operation of the clutch, a pair of levers connected with the rods extending out of the change gear case, slidable blocks carried by said levers, secondary levers adjacent the last two levers and connected with the foot lever, and electrical means for moving said slidable blocks into the path of said secondary levers for the engagement and disengagement of any given gear set, as described.

In testimony whereof I have hereunto set my hand this 18th day of April A. D. 1912, in the presence of the two subscribed witnesses.

HUGH D. PEASLEE.

Witnesses:
C. P. GRIFFIN,
HENRY B. LISTER.